United States Patent
Frich

(10) Patent No.: US 6,994,252 B2
(45) Date of Patent: Feb. 7, 2006

(54) COMBINATION LIBRARY PATRON-SUPERVISOR SELF CHECK-IN/OUT WORKSTATION

(76) Inventor: Mark R. Frich, 21 Ferndale St., Maplewood, MN (US) 55119

( * ) Notice: Subject to any disclaimer, the term of this patent is extended or adjusted under 35 U.S.C. 154(b) by 0 days.

(21) Appl. No.: 10/287,987

(22) Filed: Nov. 4, 2002

(65) Prior Publication Data
US 2003/0125974 A1  Jul. 3, 2003

Related U.S. Application Data

(60) Provisional application No. 60/338,899, filed on Nov. 5, 2001.

(51) Int. Cl.
*G06F 7/08*  (2006.01)

(52) U.S. Cl. .................. 235/381; 235/375; 235/380; 235/385; 705/16; 705/17; 705/18

(58) Field of Classification Search ............... 235/375, 235/381; 705/16–18
See application file for complete search history.

(56) References Cited

U.S. PATENT DOCUMENTS

| | | | |
|---|---|---|---|
| 4,114,078 A | | 9/1978 | Malinski et al. |
| 4,141,078 A | * | 2/1979 | Bridges, Jr. et al. ........ 235/375 |
| 4,153,931 A | | 5/1979 | Green et al. |
| 5,260,690 A | * | 11/1993 | Mann et al. ............. 340/572.2 |
| 5,288,980 A | * | 2/1994 | Patel et al. .................. 235/381 |
| 5,609,223 A | * | 3/1997 | Iizaka et al. .................. 186/61 |
| 5,777,884 A | | 7/1998 | Belka et al. |
| 5,963,134 A | | 10/1999 | Bowers et al. |
| 6,057,763 A | | 5/2000 | Brace et al. |
| 6,195,006 B1 | * | 2/2001 | Bowers et al. ........... 340/572.1 |
| 6,369,709 B1 | | 4/2002 | Larson et al. |
| 6,571,218 B1 | * | 5/2003 | Sadler ........................ 705/16 |

OTHER PUBLICATIONS

Bibliotheca RFID Library Systems AG—Web page literature. Printed 2003.*

* cited by examiner

*Primary Examiner*—Ahshik Kim
*Assistant Examiner*—Seung H Lee

(57) ABSTRACT

A combination patron-supervisor library self-check-in/out workstation includes both a patron visual display and a supervisor visual display so that a supervisor can monitor patron initiated transactions so that the supervisor may in real-time have access to the patron visually displayed patron operational information as well supplemental information.

29 Claims, 8 Drawing Sheets

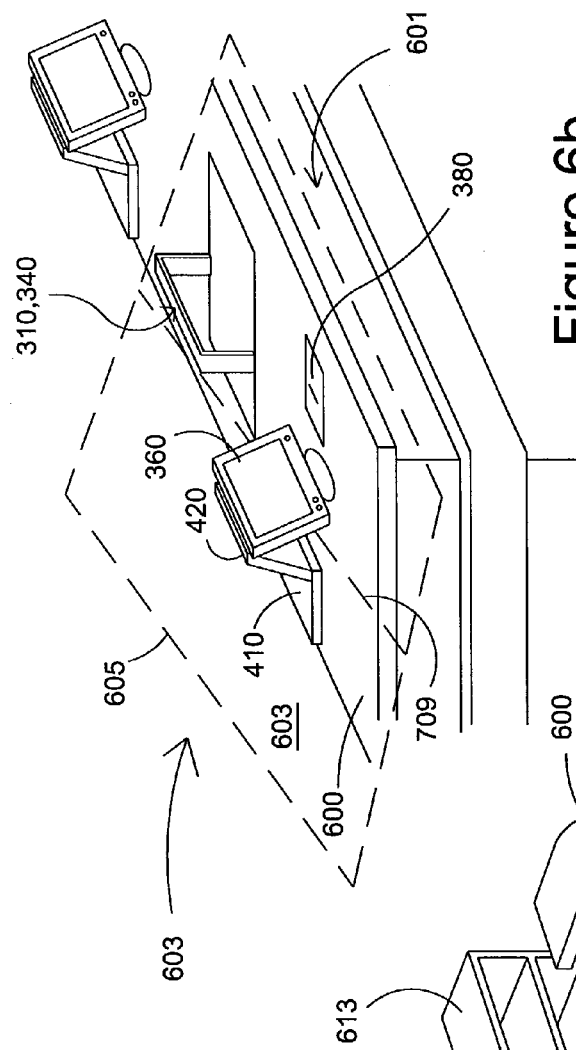
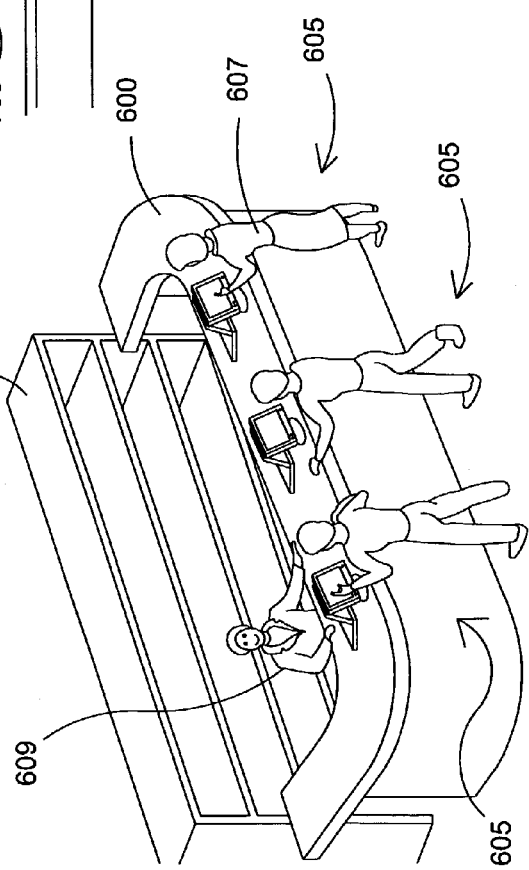
Figure 6b
Figure 6a

COMBINATION LIBRARY PATRON-SUPERVISOR SELF CHECK-IN/OUT WORKSTATION

RELATED APPLICATION

This application claims the benefit of priority pursuant to 35 USC 119 of provisional patent application Ser. No. 60/338,899 filed 5 Nov. 2001, the disclosure of which application is hereby incorporated in its entirety by reference herein.

FIELD OF THE INVENTION

The present invention relates to a library circulation control system and more particularly to a computer controlled self-checkout station and system for processing library transactions including security for unauthorized removal of library books.

BACKGROUND OF THE INVENTION

In older conventional library system, library articles from the library collection, including among others books, video tapes, magazines, and the like, were checked out and otherwise processed manually, and circulation records were maintained by manual entries on index cards. This process, of course, was slow and cumbersome and typically required a substantial number of workers to keep the records current. Special functions such as placing books on hold or reserve, preparing lists of overdue books and fines, and taking inventory of the library stock required additional substantial time and manpower. More sophisticated work such as preparing statistical reports about patrons and circulation were extremely difficult with manual systems. Moreover, additional personnel were required at each library exit to maintain security by checking all outgoing library materials.

Many advances in the art have occurred such as that described in U.S. Pat. No. 4,414,078, entitled, "Library Circulation Control System", issued to Brides, et. al, and is herein incorporated by reference in its entirety. FIGS. 1a and 1b are to substantially a replication of FIGS. 3 and 4 of the aforesaid patent illustrating a checkout station of the prior art.

From the text of the aforesaid patent, referring to FIGS. 1a–1b herein, a "book processor stations interface 18 is connected to a plurality of book processor stations 30 for charging and discharging books and for displaying and modifying the computer data files. Each station 30 includes an identification card reader 32, a display unit 34, a keyboard 36, an optical scanner 38, a book activate/deactivate unit 40, a printer 42 and a control panel 44. A station logic unit 43 interfaces between each of the station components and library terminal 12. Logic unit 43 coordinates the transfer of data, control signals and status signals between the library unit 12 and the components of station 30. Card reader 32 reads an identification card which provides access for the user or librarian to station 30. The identification card is inserted in card reader 32 and a ten digit number on the card is matched with an authorized number in an appropriate data file before a transaction can be performed at the station. Display unit 34 provides alphanumeric messages to prompt the user or librarian on the use of book processor station 18. Specific step-by-step instructions are displayed for each function that is performed. Keyboard entries by the operator from keyboard 36 are displayed as entered. Additional messages, such as confirmation of action and file data are displayed as requested.

A bar-coded label on each book representing the book circulation number is read by optical scanner 38. The book is oriented in a book tray at the station with the label facing up and the spine of the book facing the front of the station. Scanner 38 reads a nine digit number on the label and generates signals representing the number which are transferred to computer 14. Activation and deactivation of a magnetic strip in a book is performed by the activate/deactivate unit 40 located under the book tray. The strip located in the spine of each book is demagnetized when the book is charged or checked out and magnetized when the book is discharged or returned. Deactivation of the strip occurs on command from computer 14 after it is determined that the user is permitted to charge the book. Failure of the user to deactivate the strip before taking the book from the library will initiate an alarm at the library exit." A printer 42 is provided for a hard copy printout of the patron-initiated transaction.

The aforedescribed automated library system combines circulation control and theft detection functions in one system. The input and output devices were designed for operation by untrained patrons for several simple functions such as charging out books, and can easily be switched to a different mode by librarians to perform additional more sophisticated tasks. As disclosed, the library checkout system utilized a centralized computer for data processing and storage of the collection cataloging database like those well known in the art, and remote terminals could be conveniently located for easy patron use. Access to the terminals by patrons is provided by the presentation of an authorized patron identification card to the terminal. The patron then performs the charging or checkout and security functions using the remote terminal without the aid of a librarian. In operation, a book is placed in a remote station book tray where an identifying label on the book is read by an optical scanner mounted above the tray. At about the same time, a sensitized magnetic strip in the book binding is demagnetized to allow the book to be taken past magnetic detection devices at the library exits. The remote station book tray is structured to accept only one book during the charging and demagnetizing operations. The computer that also prepares and stores transaction records and performs other data processing functions conducts control of the remote terminal functions. The terminals may be key accessed by librarians to generate, modify and interrogate data files in the computer, to override the automatic patron functions and to test the operability of the system. The transaction records and other data files may be either periodically communicated by the computer to a central data processor for updating master inventory files, or may be operative in real-time.

In another aspect of the system disclosed in the aforesaid patent, the remote terminal includes a tag reader or interrogator for reading indicia on a single stationary book to identify the book and generate a signal representative of the book indicia. An authorization card reader in the housing identifies indicia on an identification card inserted therein and generates a signal representative of the identification card indicia. In turn, these aforementioned signals are transmitted to a computer for processing, verifying, among others, an authentic ID card, permissions associated with the ID card, and a cataloging operation assigning the book as "checked out," or other information, to the ID card.

In accordance with yet another aspect of the aforementioned patent, a processor includes an actuable device for changing an alterable element on each of the library items, one at a time, to modify the circulation status of the item in response to actuating signals from the library system, e.g., a magnetizing strip well known in the art and disclosed in U.S. Pat. Nos. 6,057,763 and 5,777,884 and 5,260,690, all of which are incorporated herein by reference in their entirety.

The aforementioned tag may be a static label attached to a library article. Visual indicia on one side of the label includes a plurality of coded bars, each bar being representative of a decimal number to identify the library item. Means on the other side of the label affix the label to the item so that the label is removable from the item only by being damaged so that it cannot be affixed to another library item.

Another checkout station is disclosed in U.S. Pat. No. 5,288,980, entitled, "Library Check Out/Check In System", issued to Patel, et. al., and is herein incorporate by reference in its entirety. As described therein, many of the inherent functions of the components previously described, and those described in the just recited patent were contemplated as having a wide range of alternate structures and embodiments, including present day RFID tags, smart cards, and the like. As recited in the just mentioned patent:

"As presently contemplated, the patron and/or article identification labels are formed as a printed bar code which is scanned with a beam of light or a bar code recorded on magnetic tape which is scanned with a reading head. The labels can alternatively be implemented as a miniaturized, coded semiconductor chip transmitter, which includes a static random access memory (SRAM) to store the code, a radio frequency (RF) transmitter and a battery power supply. Such a transmitter may be activated and read by an RF semiconductor chip transmitter-receiver that feeds the received signal to a logic circuit to decode or translate the signal before it is passed to the data processor.

In another embodiment the label may be implemented as a miniaturized, coded ultrasonic wave transmitter which includes a SRAM, an ultrasonic transducer, and a power supply. That circuit may be activated and read by an ultrasonic transducer and decoded by a logic circuit. The patron identification label can be, but is not necessarily the same as one of the article identification labels. If it is not the same as one of the article labels, a separate reader is supplied . . .

As with the patron/article identification labels, various types of security labels may be used within the scope of the present invention. Though conventional magnetic security labels may be used where the terminal and security gate are disposed immediately adjacent each other, other applications may be facilitated by the use of security labels having additional information and capabilities. For example, such additional information may be useful where a variety of sensor stations may be disposed throughout a facility in order to monitor the flow and location of articles within the facility . . .

In the most conventional embodiment the security label can be implemented as a strip of magnetic material . . . Alternatively, the security label can be a miniature coded semiconductor assembly where the label can contain an abundance of information about the article, which can include the circulation status, patron/article identification indicia, the return due date of the article, and the nature of the article, e.g. whether it is a document, a tape cassette or a book. The semiconductor device assembly may include a SRAM, which contains the coded information that is fed to an RF transmitter-receiver, and a battery power supply. The encoder at the terminal includes a SRAM, where the code is generated by the terminal electronic data processor, a logic circuit to formulate the code for transmission to the semiconductor device assembly at the article, and an RF transmitter-receiver that activates the semiconductor device assembly and transmits to it the coded information for storage in the semiconductor device assembly SRAM. The security gate/sensor station may be provided with a reader having the same components as the encoder at the terminal. Its operation, however, is the inverse of the encoder. The SRAM receives the coded information from the electronic data processor at the terminal via a communications link, which has been described as part of the security system . . . The reader/encoder RF transmitter activates the device assembly to transmit its coded information to the reader/encoder. The received information is decoded by the logic circuit and compared in the logic circuit to the information in the SRAM, which, as described, was received previously from the terminal via the communications link. The comparison enables the logic circuit to pass or not pass the article through the security gate. The communications link can be implemented by transmitter-receivers that are connected [whether] by a wire cable, a fiber optic cable, sound waves, light waves, or electromagnetic waves."

Another checkout station is disclosed in U.S. Pat. No. 6,369,709, similar in structure as those previously described and is herein incorporated by reference. As taught therein, the check-out system further includes a video camera for recording the transaction, and includes a plurality of patron related described functions including financial tractions such as fines and the like.

These aforedescribed prior art library checkout systems allow a patron to charge out library materials without assistance or supervision by library personnel, resulting in a potential savings of time and labor. The theft detection unit incorporated in such systems is an integral part of the circulation control system so that the demagnetization and magnetization of the detection strip in each book is intended to be accomplished during charging and discharging of the book without additional effort by the patron or the librarian. The systems of the prior art have an advantage in that they allow the librarian to have direct access to the computer data storage in order to build and modify data files, provide special instructions to the computer controller, and determine the readiness of each remote terminal of the system.

Further advances and/or refinement of the systems as just described include the replacement of a common bar code tag with an RFID tag which is combined with a cataloging system as shown and described by U.S. Pat. No. 5,963,134, entitled, "Inventory System Using Articles With RFID Tags," issued to Bowers, et al., all of which is incorporated herein by reference in its entirety. Illustrated in FIGS. 2a and 2b are substantially a replication of FIGS. 2 and 3 of the just mentioned patent illustrating an RFID checkout station of the prior art. FIG. 2a illustrates a schematic block diagram of an RFID tag suitable for use on articles or materials, including magnetic media and the like, circulated by the library; FIG. 2b is a detailed functional block diagram schematic of an interrogator for use in reading the tag of FIG. 2a.

In accordance with the article inventory control system of U.S. Pat. No. 5,963,134, an RFID tag is attached to each library article. Each RFID tag has a unique identification or serial number for identifying the individual article. An inventory database tracks all of the tagged articles in a similar manner as previously described in the earlier mentioned patents, and maintains circulation status information for each article. Articles are checked out of the library using a patron self-checkout system similar in structure as previously described. It should be recognized that employment of a RFID tag obviates the need of the magnetizing strip commonly attached to library articles, and the accompanying magnetizing and demagnetizing systems as suggested in the aforesaid in the U.S. Pat. No. 5,288,980. Further, employment of RFID tag system permits the interrogation of a plurality of articles simultaneously—i.e., each article does not have to be scanned or interrogated separately as in the case for bar code tags and accompanying readers. In fact, it is shown in the last mentioned patent that a stack of articles with an RFID patron card many be interrogated in a single operation or introduction of the stack and card in the designated receiving area of the articles.

Although the aforementioned check-out systems enhance library cataloging, and provided advances in check-in/out systems, including security, there remains a great need for increase throughput, ease of use, and being environmentally friendly. More specifically, although the aforementioned prior art systems are primarily directed to patron self-check-out of library articles and the like, patrons commonly avoid them and desire the "interpersonal comfort" of the librarian at the checkout. Further, although the "adventurous" library patron may be inclined to use a library article self-check-out system, patrons frequently require librarian assistance in doing so, despite the patron's best efforts. The latter, of course, diminishes the whole purpose of the "self-check out system.

Common problems which require a librarian's assistance at the check-out may include among others, an expired or damaged patron identification card, accumulated late fines prohibiting check-out, article tag and article tag interrogation problems, and the like. In addition, basic non-familiarity with the system may require patron training. These and other scenarios necessitates a librarian leaving their work station to assist a patron at the self check-out system, and taking time away from other important librarian tasks such as research and the like.

SUMMARY OF THE INVENTION

An object of the present invention is to provide a check-in and checkout system that enhances librarian efficiency and patron support for speedy check-in/out functions.

A combination patron and staff library self-check-in/out work station is provided for selectively checking in/out library articles, where each article includes a discrete identification element attached thereto, and wherein the discrete identification element has information associated therewith specific to the accompanying article, and where each patron is issued a unique patron identifier, the library check-in/out work station. A workstation includes a patron identifier to identify the unique patron associated with a current patron initiated transaction for assigning the current patron initiated transaction to a specific patron. An article interrogator is arranged in conjunction with a designated article receiving area for subsequent retrieval of information from the discrete identification element associated with a received article or articles introduced into the article receiving area for providing an output representative of the retrieved information. A patron control unit is provided that includes at least one patron visual display for displaying first selected patron operational information associated with the current patron initiated transaction. A supervisor control unit is provided that includes at least one supervisor visual display for displaying second selected patron operational information associated with the current patron initiated transaction, including, at least in part, the first selected patron operational information. A system controller is coupled to the interrogator, the patron identifier, the patron control unit, and the supervisor control unit, so as to concurrently display the first selected patron operational information on both said patron visual display and said supervisor visual so that a supervisor may monitor said display operational information during said current patron initiated transaction to assist a patron as needed.

DESCRIPTION OF THE DRAWINGS

FIGS. 6a–6b is a perspective view of a library check-in/out workstation in accordance with the present invention.

DESCRIPTION OF THE DRAWINGS

Figure 1A:
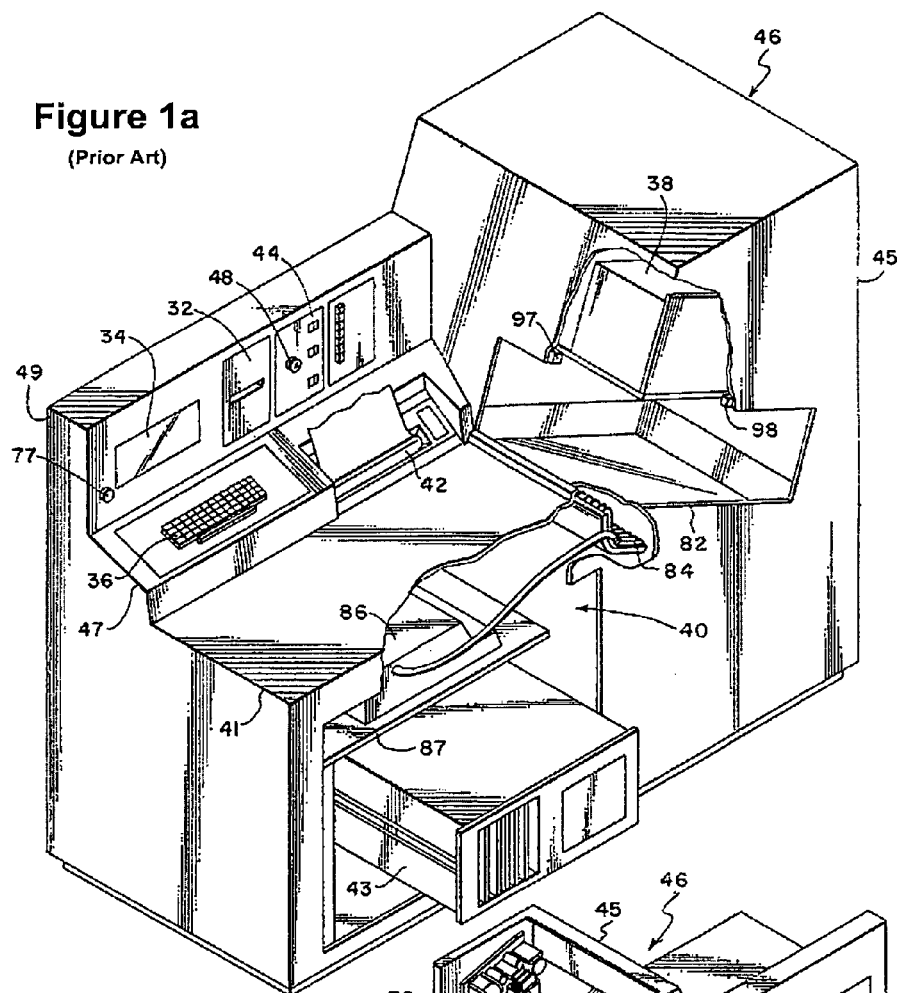
FIGS. 1a and 1b illustrate a perspective view of a library checkout system of the prior art.
Figure 1B:
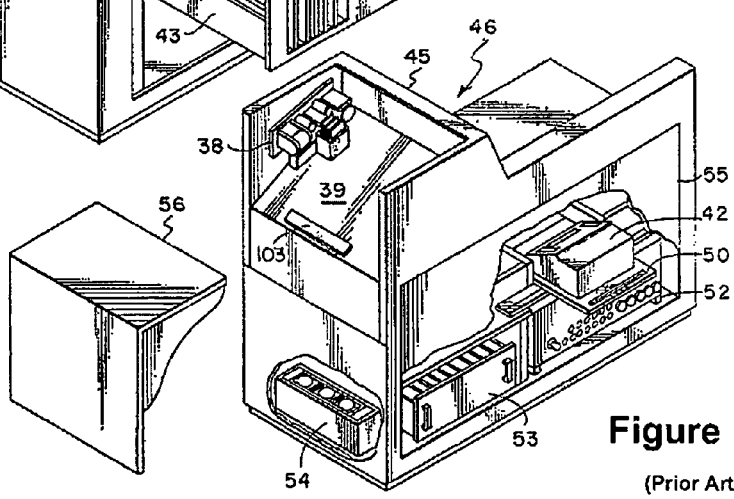
Figure 2B:
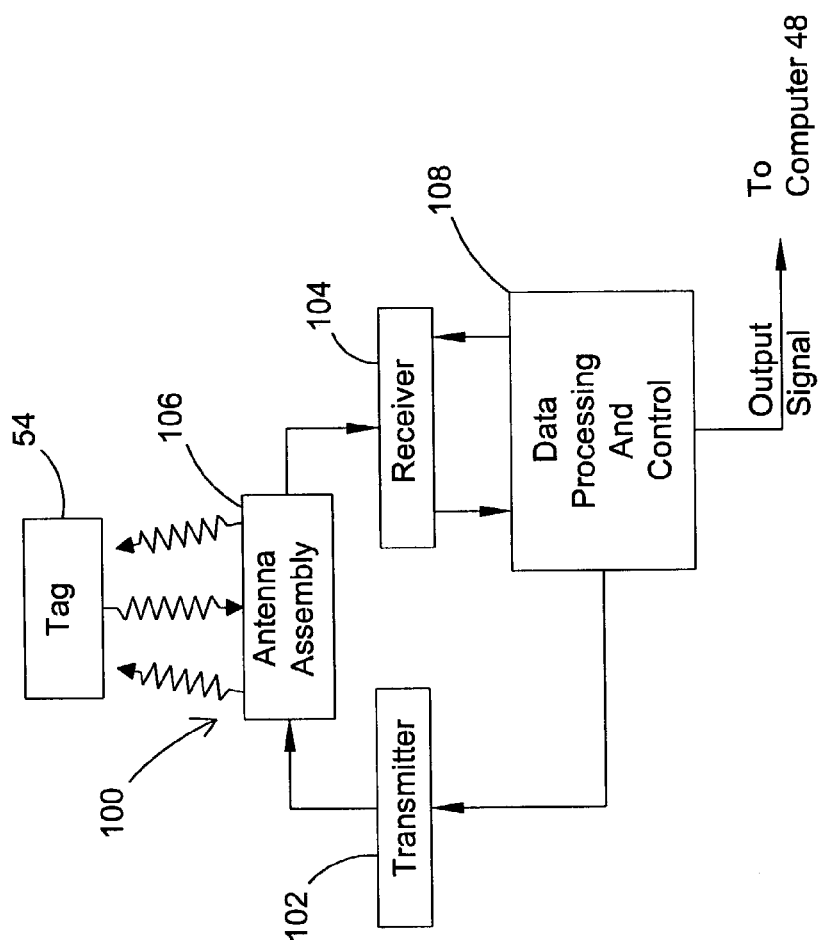
FIGS. 2a and 2b illustrate an RFID tag and interrogator of the prior art.
Figure 2A:
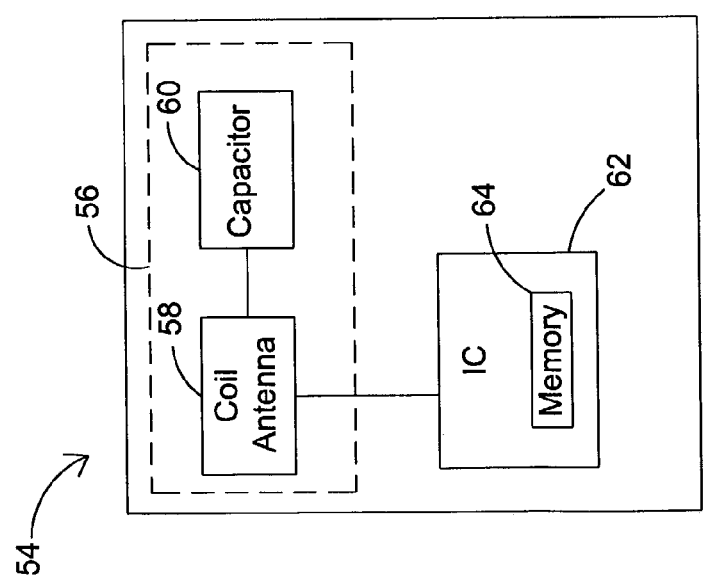
Figure 3:
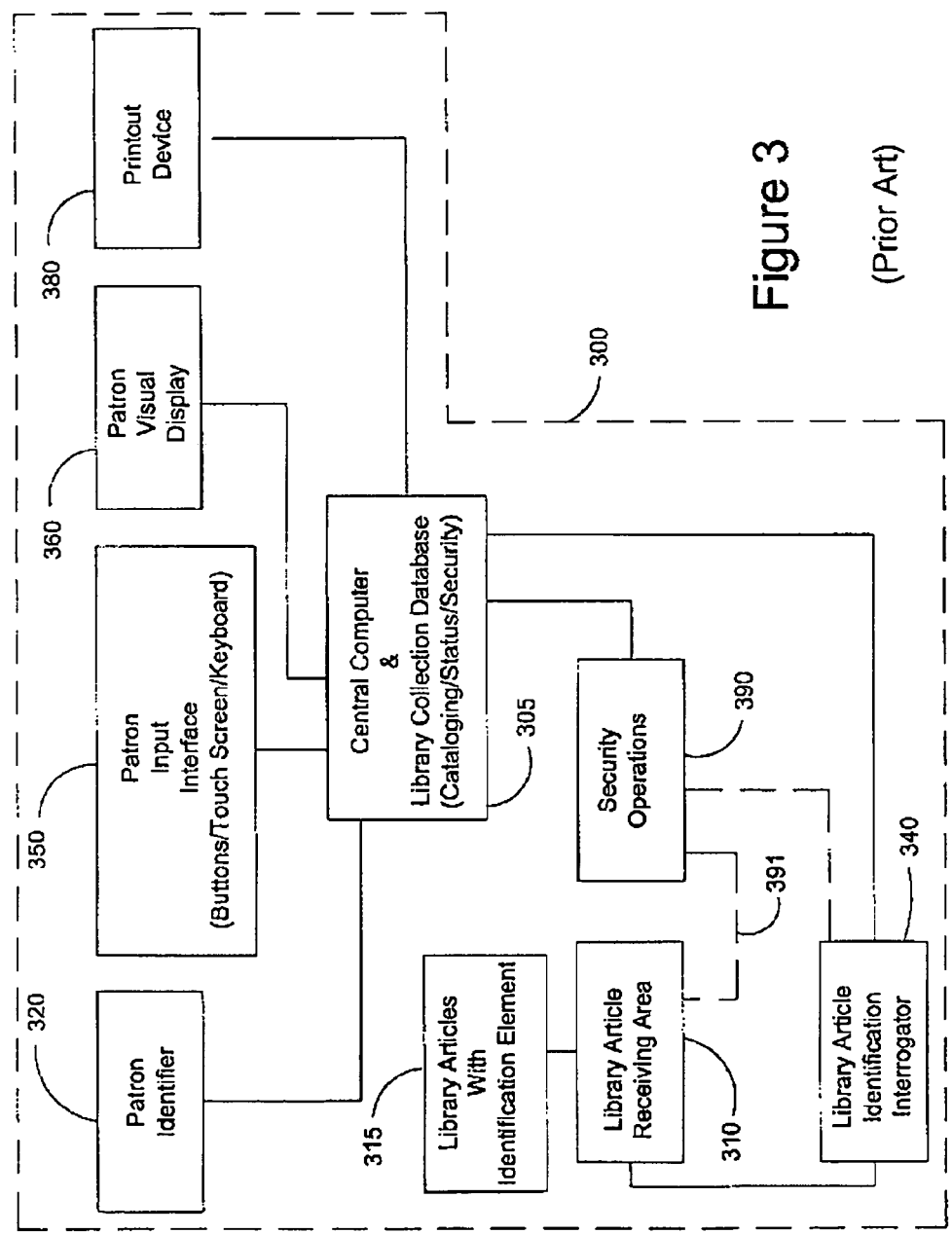
FIG. 3 is a block diagram of a library check-in/out workstation of the prior art.

Illustrated in FIG. 3 is a block diagram illustrating components of a library self-check-in/out workstation 300 commonly found in the prior art. Of course, the purpose of the a library self-check-in/out work station 300 is to provide an automated library circulation status update of the library articles inventory or library collection database known in the art, and in some situations, a security operation, as is generally indicated by central computer block 305 which also serves as the system controller for general library circulation maintenance functions as well as slave-master functions for a remote library self-check-in/out work station 300. Details of system controller or computer 305 have been omitted herein for they have been shown and described in the aforementioned patents, and commonly found and well known in the prior art.

As further shown in the prior art work station 300 of FIG. 3 is a library article receiving area 310 for receiving library articles each with a discrete identification element 315 having information associated therewith specific to the accompanying article. A library article identification interrogator 340 is associated with the receiving area 310 for interrogating an article introduced into the receiving area 310 so as to obtain the information from the discrete identification element 315 associated with an article being interrogated. Further, a patron identifier 320 is provided for receiving a patron card or the like for identifying the patron whom is attempting to initiate a transaction, i.e., checking-in/out library articles, and assigning the particulars of the transaction to a specific patron.

Work station 300 commonly includes a patron input interface or control unit which may include a variety of input/output devices such as a push button switches, a keyboard, a touch screen display, or the like. Further, workstation 300 commonly may include a patron visual display 360 and patron print out device 380. Patron visual display 380 is intended to provide selected patron operational information associated with the current patron initiated transaction, including among other information, operational instructions and transaction process feedback information.

As indicated earlier, central computer 305 serves as the system controller that is coupled to article interrogator 340, the patron identifier 320, the patron input interface 350, patron display unit 360, and printout device 380.

Besides circulation status of library articles, central computer 305 may also be utilized in a variety of ways to provide a security function. In FIG. 3, security operations block 390 is shown coupled to central computer 305 which in turn may be coupled to the library article interrogator and/or library article receiving area for performing security functions as will be briefly described below.

In an exemplary embodiment and operation of a prior art library self-check-in/out work station 300, a patron is issued a library card having a bar code label thereon that is assigned to a specific patron or user, which may also be a library staff person. Each of the library articles includes a discrete bar code label. Since the bar code has been previously inputted into the library's circulation database, the article may be correlated to the library collection database as is well known.

The workstation may be in a standby mode where the patron visual display 360 may instruct the user to place the library card in a specific area in a specific orientation and manner for interrogation by a bar code scanner that serves as the patron identifier 320. Once the patron is identified, the patron may be instructed to place an article, having an identification element 315 in the form of a bar code, in the article receiving area 310 that includes another bar code scanner that serves as the article identification interrogator 340. In turn, computer 305 may verify the library article is part of the library collection, change the status in the collection data base for the particular article, assign it checked out to particular patron, and initiate a security operation—signal line 391, such as demagnetizing a magnetic strip affixed to the article.

In turn, the patron may be instructed to introduce another article or initiate a termination or cancellation of the transaction, or given other instructions such as wait for print out 380 for a hard copy receipt of the transaction, be notified of an expired card, be notified of an article not part of the library's collection, or variety of other instructions. As, indicated earlier, there are a variety of problems that be incurred in this patron activated self check-in/out transaction that may require a library staff person.

As indicated earlier, the basic functions as just described may be implemented by a variety of techniques and devices. For example, the patron identifier 320 may be implemented by keying in a secret code, the library card may be in the form of a magnetic strip card (charge card), a smart card which in effect is an electronic memory card, a card with an RFID tag thereon, and the like—all of which may identify the patron. Similarly, the discrete bar code label 315 associated with each of the of the articles may be replaced with an RFID tag, an ultrasonic tag, or smart RFID tag, like that manufactured by "TAG SYS," which may include a device that not only may be interrogated, but also being capable of being altered to set a security status bit. Accordingly, the article identification interrogator 340, of course, would correspond to the article's discrete identification element. It should also be noted that in the particular case of RFID tag type systems, multiple articles may be interrogated essentially simultaneously along with the patron identification RFID tag and the like, as is well known and understood in the art.

Figure 4:
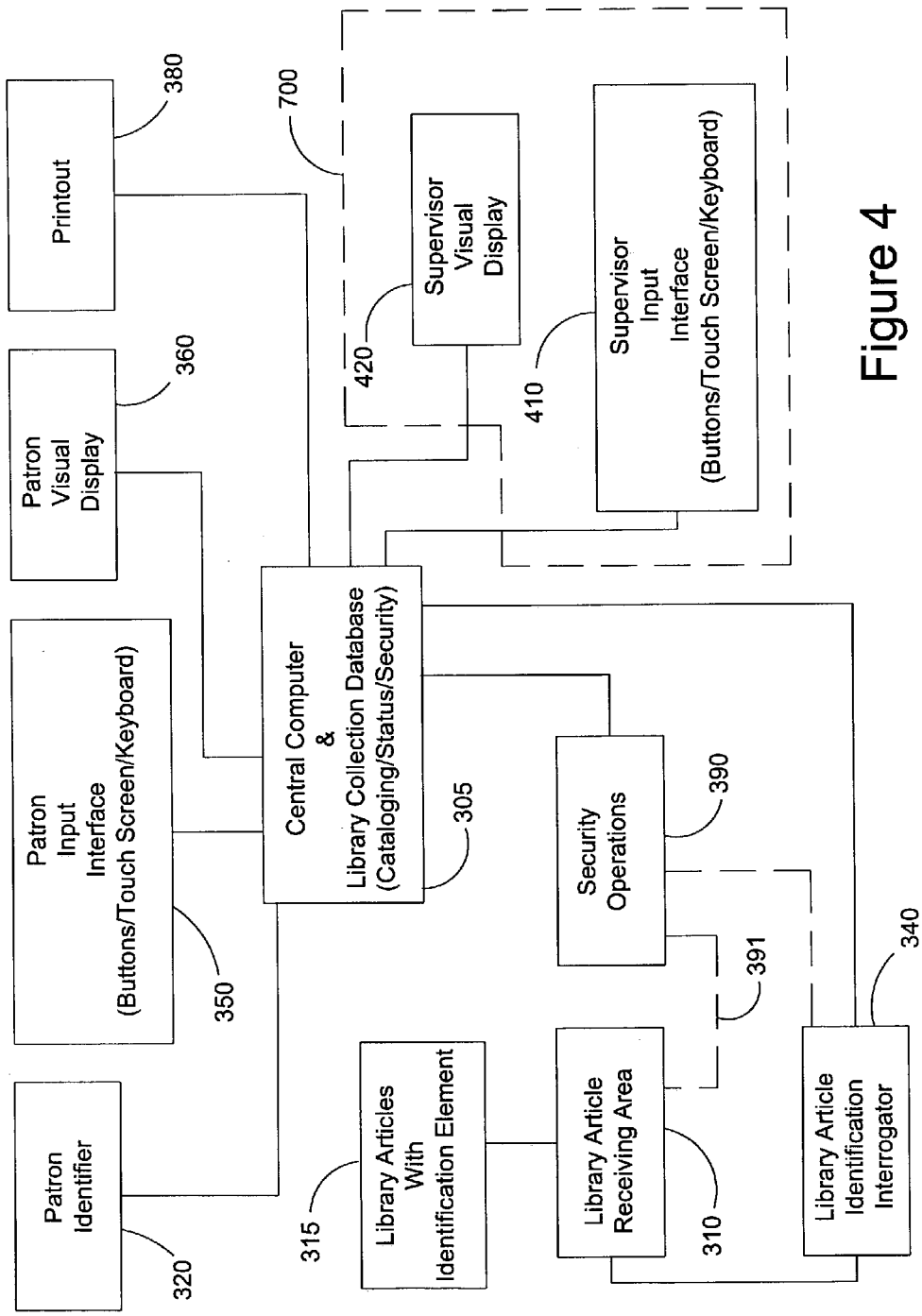
FIG. 4 is a block diagram library check-in/out workstation in accordance with the present invention.

FIG. 4 is a block diagram if a library check-in/out workstation in accordance with the present invention. Components or blocks serving the same function as those already described with reference to FIG. 3 have retained the same numeral designation in FIG. 4. In accordance with the present invention, a combined patron-supervisor self-check-in/out system is provided with both a patron visual display 360 and a duplicating supervisor visual display 420 so as to provide visually substantially the same patron operational information to a supervisor as being viewed by a patron in real-time. As illustrated in FIG. 4, supervisor control unit or interface 410 and a supervisor visual interface 420 may be coupled to the same central computer 305 that provides the system control for the overall patron initiated transaction and visually displaying information on visual display 360 as already described, or alternatively may be coupled to a localized computer control system associated with the local workstation for subsequent data movement to a central computer 305 for control and cataloging updating of the library collection database.

Figure 5:
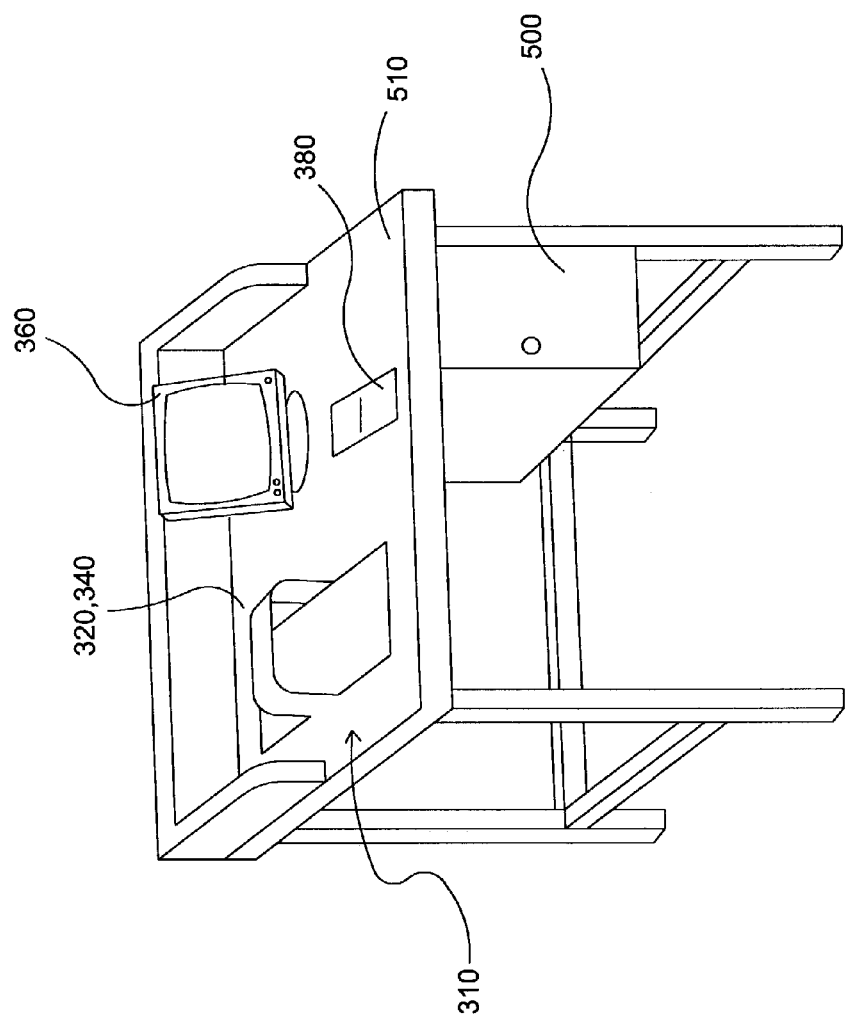
FIG. 5 is a library check-in/out workstation in accordance with the present invention.

Although the present invention is particularly applicable to both a library self check-in/out workstation, the following exposition will describe the present invention with regard to a checkout transaction. Further, in the following description of the present invention, an RFID tag patron identification card 320 and an RFID tag article identification element 315 will be assumed. Such a system is illustrated in FIG. 5 where counter 510 supports a patron visual display 360, a printout device 380, a combined article and patron identification card receiving area 310 integrated with and coupled to an RFID interrogator 340 having control circuitry 500 and the like that may be physically located beneath the counter 510.

The structure as just described is operative in a similar manner as already described. More specifically, the patron visual display 360 may be a touch sensitive screen so as to provide a combination display 360 and input/output interface 350. Display 360, as before, is intended to provide patron operational information associated with the current initiated transaction. In accordance with RFID technology, placement of an RFID patron identification card on a stack of articles, each having an RFID tag, will allow the RFID interrogator 360, 500 to upload all of the necessary patron and article information to the central computer, to authorize the transaction, and perform selected security functions.

It should be noted that the security operations 390 as particularly illustrated in FIG. 4 may be implemented by a variety techniques as indicated earlier including setting a bit in an alterable RFID tag as indicated earlier. Of course, employment of an RFID tag eliminates the need for a de-magnetizing/magnetized security strip. Lastly, the system arrangement as that shown in FIG. 5 could be altered to accommodate both a bar code scanner and magnetizing strip security operation, of course, depending upon the interrogation techniques chosen for providing the necessary patron and article information.

Illustrated in FIG. 6a is combination patron-supervisor self-check-in/out workstation arrangement in accordance with the present invention, and FIG. 6b is a more magnified depiction of the workstation counter in accordance with the present invention. As illustrated in FIG. 6, thereshown is a counter 600 arranged to have one or more combined patron-supervisor workstation arrangements 605. Counter 600 is shown to have patron 607 accessible workstations on one side, and the opposite side thereof being accessible by a library staff person or workstation checkout supervisor 609. Behind the supervisor 609 may be library collection shelves 613 as desired accessible by the workstation supervisor 609.

Referring more particularly to FIG. 6b, the combined patron-supervisor workstation arrangement 605 includes the same components as those illustrated in FIG. 5, having the same numeral designations therein, and additionally the supervisor controller or interface 410 and supervisor visual display 420 as particularly illustrated in FIG. 4. The counter 600 may be visualized as having a patron side 601 and a supervisor side 603. Patron accessible components being similar to that with reference to FIG. 5, whereas the supervisor accessible side 603 includes supervisor controller 410 and visual display 420.

Figure 7:
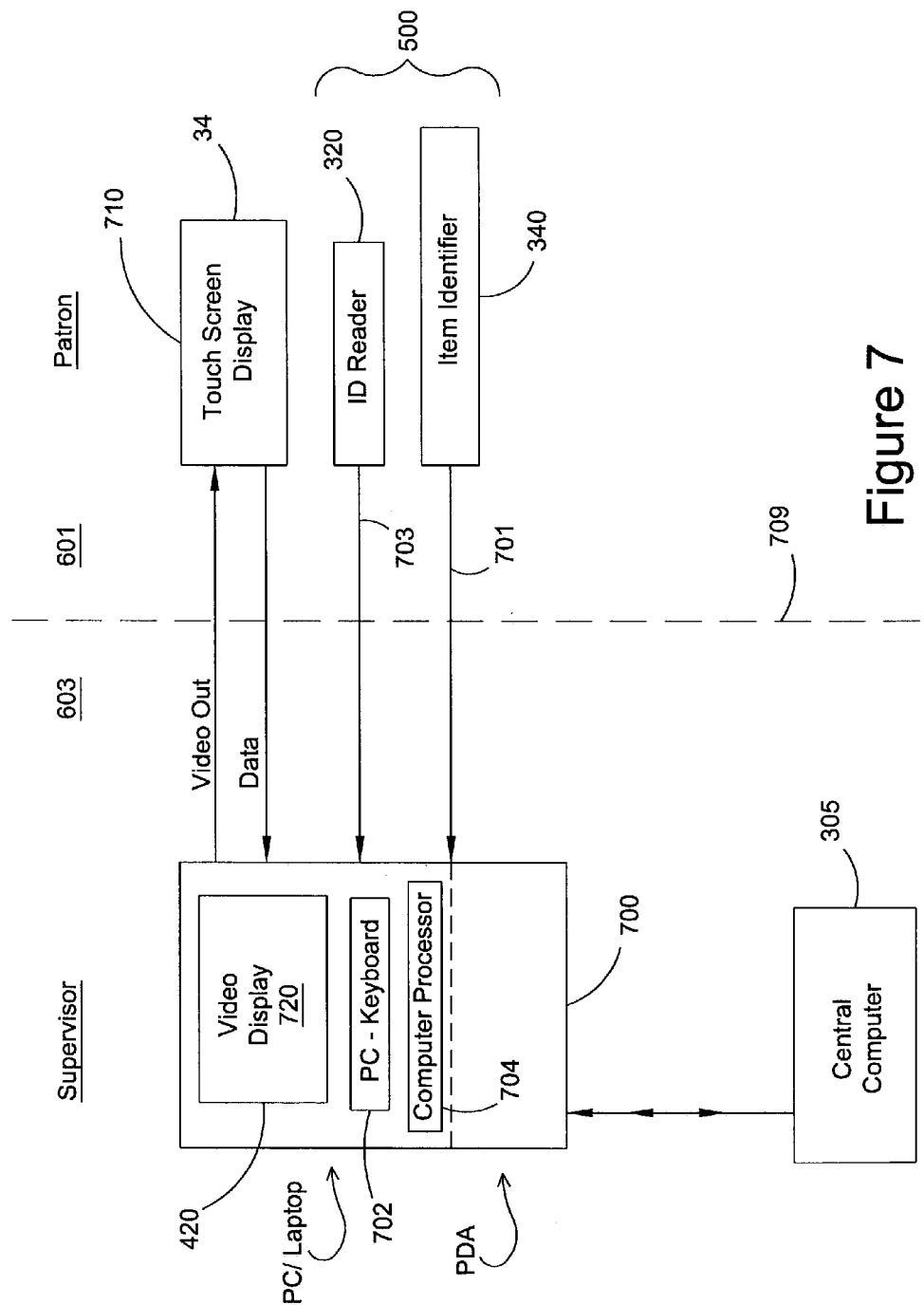
FIG. 7 is a simplified block diagram of a supervisor display and a patron display and accompanying interface functions.

Referring to FIG. 7, a supervisor terminal controller 700 provides the supervisor input interface or control unit 410 and display 420 as illustrated in FIG. 4 and FIG. 6. Supervisor terminal controller 700 may simply be provided by way of a lap top computer or PDA (personal digital assistant) including video display 720, keyboard 702, and computer processor 704 as is well known, and having a variety of implementations. Alternatively, supervisor terminal controller 700 may be provide by way of a less economical stand-alone personal computer having a central computer processor 704, keyboard 702, and monitor, serving as input/out interface 410 and visual display 420, and may also include a touch screen controller as desired as is well known art. Supervisor terminal controller 700 is intended to be configured and appropriately linked to interact with central computer 305. Further, controller 700 is intended to be linked to the patron visual display in real-time so as to duplicate on the supervisor visual display 420 the patron operational information associated with the current patron initiated transaction, as well as other selected supervisor operational information associated with the current transaction, as well as other detailed information about the patron or the libraries collection as desired. The dotted line 709 in FIG. 7 represents a pseudo demarcation between the patron side 601 and supervisor side 603 of counter 600. Signal lines 701 and 703 figuratively represent the interrogator 500 information, namely the patron identification and the article(s) identification information associated with the current patron initiated transaction.

Figure 8:
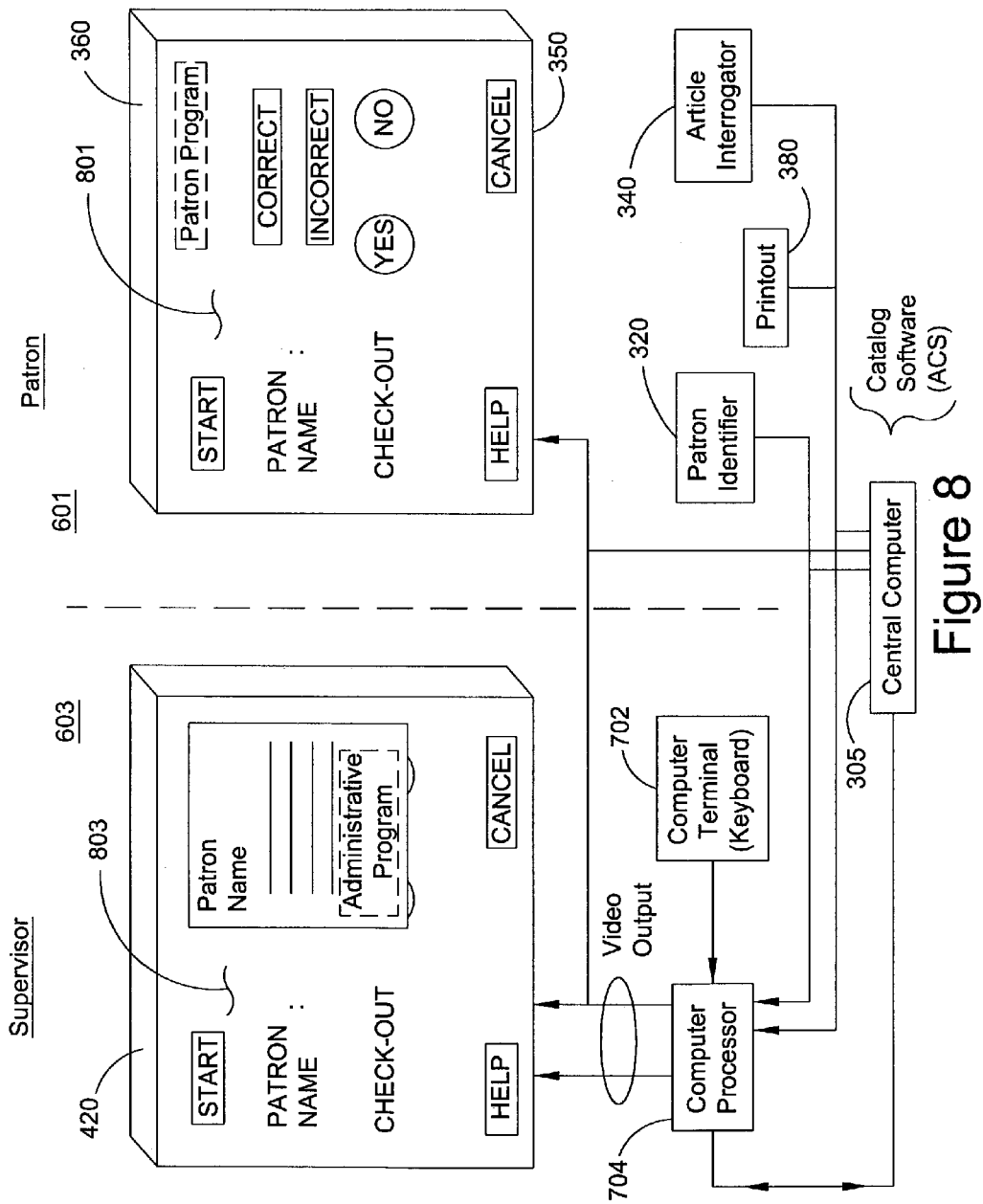
FIG. 8 is a depiction of a graphical staff display and a graphical patron display, along with a block diagram of station system components.

FIG. 8 is another graphical depiction indicating selected patron operational information 801 associated with the current patron initiated transaction as might be seen on the patron visual display 360, and selected patron operational information 803 associated with the current patron initiated transaction as might be seen on the supervisor visual display 420. The supervisor terminal controller 700, particularly the keyboard interface 702, accessible to the supervisor may be utilized to page through a variety of information screens or windows in order obtain information as desired about tthe library collection or patron by way of computer processor 704. However, it should be noted that since the supervisor visual display 420 substantially resembles the patron's visual display 360, the supervisor has instant access to problems that may be encountered by the patron and the reason for any request for assistance.

As further depicted in FIG. 8, the patron identifier 320, article interrogator 340, printout device 380, patron visual display 360 may be routed directly to central computer 305, or alternatively through computer processor 704 of the supervisor terminal controller 700.

As should be apparent to those skilled in the art, the combination patron-supervisor library check-in/out workstation of the present invention may be implemented by a wide range of devices for implementing the intended functions of mirroring patron display information to a supervisor on the opposite side of a workstation counter. Such devices include, among other, microprocessors, computers, specific hardware, firmware, and also networking software, hardware, and firmware to achieve the intended function, all of which are intended to be within the true spirit and scope of the present invention.

It should be noted that while each station 605 includes a separate supervisor controller 700, it is possible to have a single portable supervisor controller 700 that may be plugged-into a specific station as desired. Further, the supervisor controller 700 may also be a wireless device where the particular workstation identifier may be keyed-in and automatically display the desired patron visual display operational information associated with the particular workstation identifier.

While the present invention has been particularly shown and described with reference to the accompanying figures, it will be understood, however, that other modifications thereto are of course possible, all of which are intended to be within the true spirit and scope of the present invention. Various changes in form and detail may be made therein without departing from the true spirit and scope of the invention as defined by the appended claims.

I claim:

1. A library self service check-in/out work station for selectively checking in/out library articles, where each article includes a discrete identification element attached thereto, and wherein the discrete identification element has library cataloging information and/or specific library patron loan information associated therewith specific to the accompanying article, including among others, library check-in and check-out date, late fees, cataloging circulation and the like, and where each library patron is issued a unique patron identifier, the library check-in/out work station comprising:
   a combined library patron and library staff self-service counter having,
      (ii) a first counter portion accessible by a library patron from a first side thereof, and
      (ii) a second counter portion accessible from an opposing second side of said library self-service counter by a library staff person and in proximity to a library administration work area and accessible by the library staff;
   a library patron identification means, positioned and supported by said counter, and accessible by a library patron from said first counter side, said identification means responsive to said unique patron identifier associated with a current library patron initiated transaction for assigning the current patron initiated transaction to a specific patron,
   an article receiving area and article interrogator positioned and supported by said counter, and accessible by a library patron from said first counter side, wherein said article interrogator and said receiving area are arranged to interrogate the discrete identification element associated with a received article introduced into the article receiving area for providing an output representative of said information associated with said discrete identification element associated with the received article;
   a library patron control unit including a library patron accessible visual display, positioned and supported by said first counter portion, and accessible by a library patron from said first counter side, for displaying first selected library patron operational information associated with a current library patron initiated transaction, where the first selected library patron operational information includes at least operational instructions and current library patron-specific transaction process feedback information;

a library supervisor control unit including a staff accessible visual display, positioned and supported by said second counter portion, and accessible by a library staff person from said second counter side, for displaying second selected library patron operational information associated with the current library patron initiated transaction for assisting said library patron self-service check-in/out transaction; and a library cataloging system and system controller coupled to the article interrogator, the patron identification means, the library patron accessible visual display, and the library staff accessible visual display, for displaying first selected library patron operational information on said library patron accessible visual display, and displaying at least portions of said first selected library patron operational information on said library staff accessible visual display, separately or concurrently, so that a library staff person may assist a library patron self-service check-in/out transaction as required to complete a library patron initiated transaction while remaining in said library administration work area.

2. The library self service check-in/out work station of claim 1 wherein said patron identification means is selected from the group consisting of a code, a library card, a magnetic strip card, a charge card, a smart card, an electronic memory card, and a card with an RFID tag thereon.

3. The library self service check-in/out work station of claim 1 wherein said supervisor control unit is selected from the group consisting of a lap top computer, a PDA (personal digital assistant) including a video display, a keyboard, and a computer processor, and a personal computer having a central computer processor, keyboard, and monitor.

4. The library self service check-in/out work station of claim 3 wherein said supervisor control unit pages through a variety of information screens or windows.

5. The library self service check-in/out work station of claim 1, further including a central computer routed to the patron identifier, the article interrogator, a printout device, the patron visual display, and the supervisor visual display.

6. The library self service check-in/out work station of claim 1, further including a supervisor terminal controller routed to the patron identifier, the article interrogator, a printout device, the patron visual display, and the supervisor visual display.

7. The library self service check-in/out work station of claim 1 further comprising a central computer, coupled to the library article interrogator and/or a library article receiving area, operative for providing security operations.

8. The library self service check-in/out work station of claim 1 wherein said discrete identification element is selected from the group consisting of a discrete bar code label, an RFID tag, an ultrasonic tag, a smart RFID tag, and a device capable of being altered to set a security status bit.

9. The library self service check-in/out work station of claim 1 wherein multiple articles may be interrogated substantially simultaneously.

10. A combination patron and staff library self-checking method for selectively checking in/out library articles at a self-check patron station, where each article includes a discrete identification element attached thereto, and wherein the discrete identification element has information associated therewith specific to the accompanying article, and where each library patron is issued a unique patron identifier, the library self-checking method comprising the steps of:

interrogating, at a selected one self-check patron station, the unique patron identifier associated with a current patron initiated transaction;

assigning the current patron initiated transaction, at said selected one self-check patron station, to a specific patron;

receiving, at the selected one self-check patron station, an article in an article receiving area;

interrogating the discrete identification element, associated with a received article introduced in the article receiving area of the selected one self-check patron station, for providing an output representative of the information associated with the discrete identification element associated with the received article;

displaying selected patron operational information on a library patron accessible visual display positioned on a first counter portion of a first combined library patron and library staff self-service counter and accessible by a library patron from a first side thereof, where said patron operational information is visually available to a patron at the selected one self-check patron station, associated with the current patron initiated transaction, where said first selected patron operational information includes at least operational instructions and current patron-specific transaction process feedback information; and displaying on a library staff accessible visual display, positioned on a second counter portion of a said combined library patron and library staff self-service counter accessible from an opposing second side of said library self-service counter by a library staff person and in proximity to a library administration work area and accessible by the library staff, supervisor operational information including at least portions of selected patron operational information associated with the selected one self-check station so that a library staff person may assist a library patron self-service check-in/out transaction as required to complete a patron initiated transaction while remaining in said library administration work area.

11. The combination patron and staff library self-checking method of claim 10 wherein said unique patron identifier is selected from the group consisting of a code, a library card, a magnetic strip card, a charge card, a smart card, an electronic memory card, and a card with an RFID tag thereon.

12. The combination patron and staff library self-checking method of claim 10 wherein a supervisor control unit is operative for coordinating said library patron accessible visual display and library staff accessible visual display, said supervisor control unit being selected from the group consisting of a lap top computer, a PDA (personal digital assistant) including a video display, a keyboard, and a computer processor, and a personal computer having a central computer processor, keyboard, and monitor.

13. The combination patron and staff library self-checking method of claim 12 further comprising the steps of operating the supervisor control unit so as to coordinate said patron visual display and said staff visual display, to page through a variety of information screens or windows.

14. The combination patron and staff library self-checking method of claim 12, further comprising the step of routing the patron identifier; the article interrogator, and the patron visual display through a computer processor of the supervisor control unit to a central computer having a printout device.

15. The combination patron and staff library self-checking method of claim 10, further comprising the step of routing the patron identifier, the article interrogator, and the library patron visual display to a central computer having a printout device.

16. The combination patron and staff library self-checking check-in/out method of claim 10, further comprising the step of performing security functions by operating a security operations block coupled to a central computer, the central computer in turn coupled to the library article interrogator and/or a library article receiving area.

17. The combination patron and staff library self-checking check-in/out method of claim 10 wherein said discrete identification element is selected from the group consisting of a discrete bar code label, an RFID tag, an ultrasonic tag, a smart RFID tag, and a device capable of being altered to set a security status bit.

18. The combination patron and staff library self-checking check-in/out method of claim 10 wherein multiple articles may be interrogated substantially simultaneously.

19. The combination patron and staff library self-checking method of claim 10 further including means associated with said library staff accessible visual display for displaying supervisor operational information including said at least selected patron operational information associated with a selected one self-check station of a plurality of self-check stations so that a supervisor may monitor said patron operational information during the current patron initiated transaction to assist a patron at the selected one self-check station as needed.

20. A combination patron and staff library check-in/out work station for selectively checking in/out library articles, where each article includes a discrete identification element attached thereto, and wherein the discrete identification element has library cataloging information and/or specific patron loan information associated therewith specific to the accompanying article, including among others, library check-in and check-out date, late fees, cataloging circulation and the like, and where each library patron is issued a unique patron identifier, the library check-in/out work station comprising:
   a plurality of co-extensive combined library patron and library staff self-service counters, wherein each of said self-service counters includes,
      (ii) a first counter portion accessible by a library patron from a first side thereof, and
      (ii) a second counter portion accessible from an opposing second side of said library self-service counter by a library staff person and in proximity to a library administration work area and accessible by the library staff;
   a library patron identification means, positioned and supported by each of said self service counters, and accessible by a library patron from said first counter side, said identification means responsive to said unique patron identifier associated with a current patron initiated transaction for assigning the current patron initiated transaction to a specific patron,
   an article receiving area and article interrogator positioned and supported by each of said self service counters, and accessible by a library patron from said first counter side, wherein said article interrogator and said receiving area are arranged to interrogate the discrete identification element associated with a received article introduced into the article receiving area for providing an output representative of said information associated with said discrete identification element associated with the received article;
   a library patron accessible visual display, positioned and supported by said first counter portion of each of said self service counters, and accessible by a library patron from said first counter side thereof, for displaying first selected patron operational information associated with a current patron initiated transaction, where the first selected library patron operational information includes at least operational instructions and current patron-specific transaction process feedback information;
   a library supervisor control unit including a staff accessible visual display, positioned and supported by said second counter portion of each of said self service counters, and accessible by a library staff person from said second counter side thereof, for displaying second selected patron operational information associated with the current patron initiated transaction for assisting said library patron self-service check-in/out transaction; and
   a library cataloging system and system controller coupled to the article interrogator, the patron identification means, the library patron accessible visual display and the library staff accessible visual display associated with each of said self service counters, for correspondingly displaying on each respective patron accessible visual display on each of said counters said first selected patron operational information, and for at least corresponding displaying, concurrently or separately, on said library staff accessible visual display at least portions of said first selected patron operational information so that a library staff person may assist a library patron self-service check-in/out transaction as required to complete a patron initiated transaction while remaining in said library administration work area.

21. The combination patron and staff library check-in/out station of claim 20 wherein multiple articles may be interrogated substantially simultaneously.

22. The combination patron and staff library check-in/out work station of claim 20 wherein said discrete identification element is selected from the group consisting of a discrete bar code label, an RFID tag, an ultrasonic tag, a smart RFID tag, and a device capable of being altered to set a security status bit.

23. A combination patron and staff library check-in/out work station for selectively checking in/out library articles, where each article includes a discrete identification element attached thereto, and wherein the discrete identification element has information associated therewith specific to the accompanying article, and where each patron is issued a unique patron identifier, the library check-in/out work station comprising;
   a combined library patron and library staff self-service counter having,
      (ii) a first counter portion accessible by a library patron from a first side thereof, and
      (ii) a second counter portion accessible from an opposing second side of said library self-service counter by a library staff person and in proximity to a library administration work area and accessible by the library staff;
   a library patron control unit including a library patron accessible visual display, positioned and supported by said first counter portion, and accessible by a library patron from said first counter side, for displaying first selected patron operational information associated with a current patron initiated transaction, where the first selected library patron operational information includes at least operational instructions and current patron-specific transaction process feedback information;

a library supervisor control unit including a staff accessible visual display, positioned and supported by said second counter portion, and accessible by a library staff person from said second counter side, for displaying second selected patron operational information associated with the current patron initiated transaction for assisting said library patron self-service check-in/out transaction; and a library cataloging system and system controller coupled to the library patron accessible visual display, and the library staff accessible visual display, for displaying first selected patron operational information on said library patron accessible visual display, and displaying at least portions of said first selected patron operational information on said library staff accessible visual display, separately or concurrently, so that a library staff person may assist a library patron self-service check-in/out transaction as required to complete a patron initiated transaction while remaining in said library administration work area.

24. The combination patron and staff library check-in/out work station of claim 23 further including a patron identification means selected from the group consisting of a code, a library card, a magnetic strip card, a charge card, a smart card, an electronic memory card, and a card with an RFID tag thereon.

25. The combination patron and staff library check-in/out work station of claim 23 wherein said a library cataloging system and system controller is selected from the group consisting of a lap top computer, a PDA (personal digital assistant) including a video display, a keyboard, and a computer processor, and a personal computer having a central computer processor, keyboard, and monitor.

26. A library self service check-in/out work station for selectively checking in/out library articles, where each article includes a discrete identification element attached thereto, and wherein the discrete identification element has library cataloging information and/or specific patron loan information associated therewith specific to the accompanying article, including among others, library check-in and check-out date, late fees, cataloging circulation and the like, and where each library patron is issued a unique patron identifier, the library check-in/out work station comprising;

a plurality of co-extensive combined library patron and library staff self-service counters, wherein each of said self-service counters includes, (ii) a first counter portion accessible by a library patron from a first side thereof, and (ii) a second counter portion accessible from an opposing second side of said library self-service counter by a library staff person and in proximity to a library administration work area and accessible by the library staff;

a library patron identification means, positioned and supported by each of said self service counters, and accessible by a library patron from said first counter side, said identification means responsive to said unique patron identifier associated with a current patron initiated transaction for assigning the current patron initiated transaction to a specific patron, an article receiving area and article interrogator positioned and supported by each of said self service counters, and accessible by a library patron from said first counter side, wherein said article interrogator and said receiving area are arranged to interrogate the discrete identification element associated with a received article introduced into the article receiving area for providing an output representative of said information associated with said discrete identification element associated with the received article;

a library patron control unit including a library patron accessible visual display, positioned and supported by said first counter portion of each of said self service counters, and accessible by a library patron from said first counter side thereof, for displaying first selected patron operational information associated with a current patron initiated transaction, where the first selected library patron operational information includes at least operational instructions and current patron-specific transaction process feedback information;

a library supervisor control unit including a library staff accessible visual display accessible by a library staff person for displaying second selected patron operational information associated with the current patron initiated transaction associated with a specific one of said self service counters for assisting said library patron self-service check-in/out transaction upon a request for service from a selected one of said self-service counters; and a library cataloging system and system controller coupled to the article interrogator, the patron identification means, the library patron accessible visual display and the library staff accessible visual displayed information associated with each of said self service counters, for correspondingly displaying on each respective patron accessible visual display on each of said counters said first selected patron operational information, and for displaying, concurrently or separately, on said library staff accessible visual display so that a library staff person may assist a library patron self-service check-in/out transaction as required to complete a patron initiated transaction while remaining in said library administration work area.

27. The combination patron and staff library check-in/out work station of claim 26 wherein said patron identification means is selected from the group consisting of a code, a library card, a magnetic strip card, a charge card, a smart card, an electronic memory card, and a card with an RFID tag thereon.

28. The combination patron and staff library check-in/out work station of claim 26 wherein said supervisor control unit is selected from the group consisting of a lap top computer, a PDA (personal digital assistant) including a video display, a keyboard, and a computer processor, and a personal computer having a central computer processor, keyboard, and monitor.

29. The combination patron and staff library check-in/out work station of claim 26 wherein said discrete identification element is selected from the group consisting of a discrete bar code label, an RFID tag, an ultrasonic tag, a smart RFID tag, and a device capable of being altered to set a security status bit.

* * * * *